May 10, 1938. P. J. W. ENGLER 2,117,113
CONTINUOUS OIL EXTRACTING APPARATUS
Filed Sept. 29, 1936
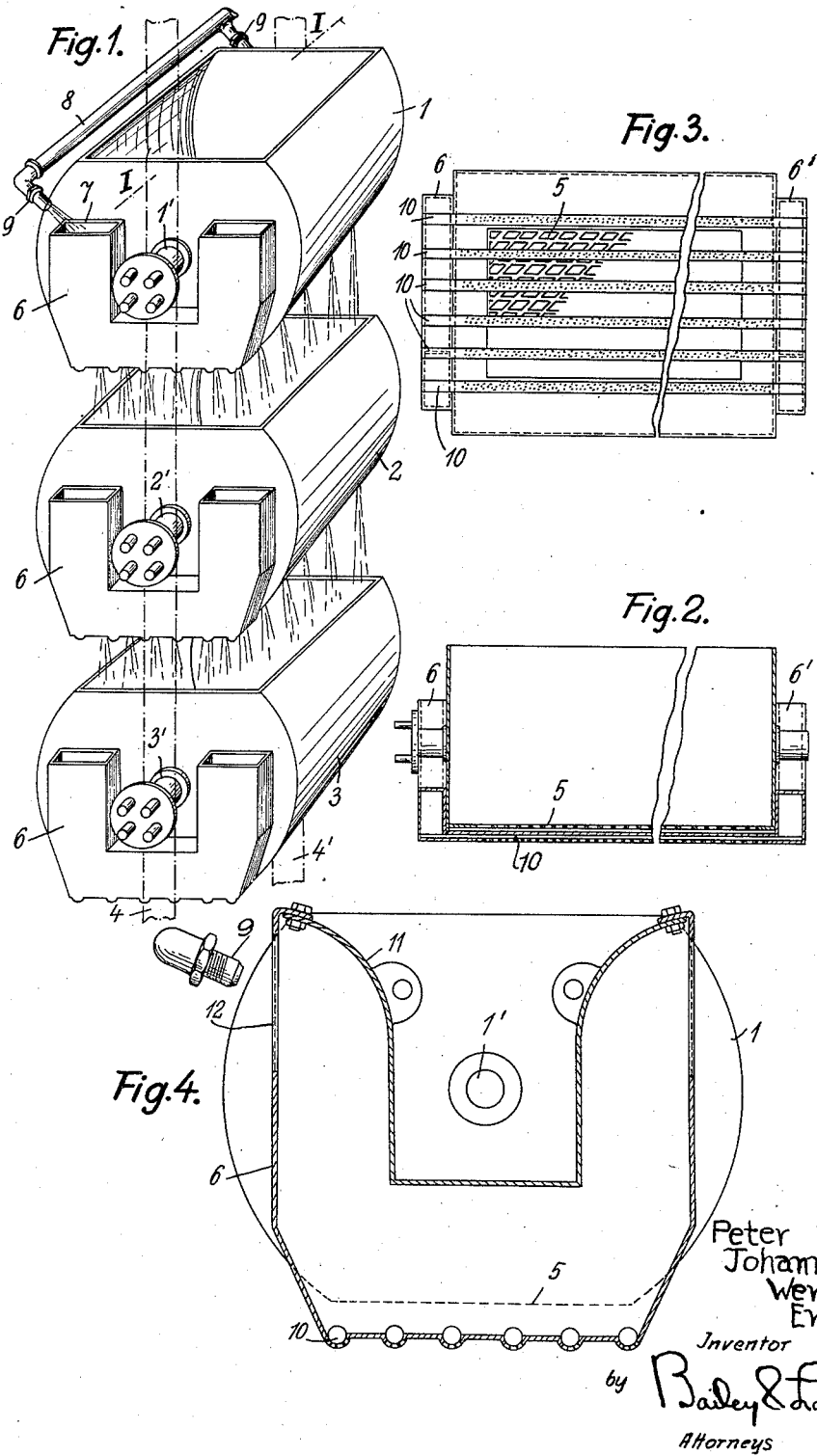
Peter Johannes Werner Engler
Inventor
by Bailey & Larson
Attorneys Patented May 10, 1938

2,117,113

UNITED STATES PATENT OFFICE 2,117,113

CONTINUOUS OIL EXTRACTING APPARATUS

Peter Johannes Werner Engler, Hamburg, Germany, assignor to the firm of Hansa-Muhle Aktiengesellschaft, Hamburg, Germany Application September 29, 1936, Serial No. 103,219
In Germany March 4, 1935

4 Claims. (Cl. 87—6)

The invention concerns continuous oil extracting apparatus of the paternoster type, in which the extraction agent trickles over the material contained in sieve boxes arranged one above the other. The use of a paternoster-like extraction apparatus in which the goods contained in sieve boxes within a chamber are treated by irrigation with solvent is known. It has been found that with certain oil seeds such as earth nut, cotton seed, linseed, rape seed and the like, the material frequently deposits solidly in the sieve boxes and that channels are formed by the spraying on of the solvent through which the solvent material flows for the greater part while the other parts of the material silt together and are impermeable to the solvent so that the yield of oil is unfavourably influenced.

It has now been surprisingly established that this disadvantage may be avoided if the irrigation with solvent is so conducted that the solvent is supplied with small kinetic energy and in fine subdivision to the material to be extracted. For this purpose, the solvent, according to a preferred embodiment of the present invention, is led into a pocket-like container preferably associated with the sieve box which is provided with an irrigating device. The said container can also be provided with a sieve or the like for the purification of the solvent, and it is preferably combined at its lower end with a multi-perforated tube which is so arranged that the solvent is as uniformly distributed as possible over the total upper surface of the sieve box next below.

An embodiment of the invention is illustrated in the drawing.

Fig. 1 shows a sieve box according to the present invention in perspective.

Fig. 2 is a longitudinal section in the direction I—I through a sieve box according to Fig. 1.

Fig. 3 is a lower view of a sieve box.

Fig. 4 is another embodiment of the invention shown in transverse section.

As is seen from Fig. 1 several sieve boxes 1, 2, 3 and so forth are attached by means of rotating pegs 1', 2', 3' to two chains 4 and 4' in known manner. The bottom 5 of the sieve box, which is open at the top, is constructed as a sieve, perforated plate or the like (Figs. 2 and 3).

According to one embodiment of the present invention at both outer sides of the sieve box, pocket-like containers 6, 6' are arranged which at the upper end have openings 7, in which the solvent for example benzine, benzol or also the so-called "half-miscella", is sprayed in by means of a tube 8, having a nozzle 9 as shown in the upper part of Fig. 1.

At its lower portion the container 6 is connected to a plurality of tubes 10 which below the sieve bottom traverse the whole extent of the base as is shown in Figs. 2 and 3. These tubes are provided with fine openings or bore holes.

If the solvent is allowed to enter by way of the tube 8 and the nozzle 9 into the container 6, then kinetic energy of the solvent stream is absorbed and the solvent flows gently under the hydrostatic pressure corresponding to the liquid height in the container 6, from the container 6 into and then through the bore holes of the irrigation tube 10, as fine rain over the goods contained in the container 2 lying thereunder, so that in this manner the whole upper surface thereof is irrigated with solvent and is rinsed in all parts. From the sieve box 2 the solvent flows through the sieve bottom of the sieve box 2 into the sieve box 3 lying thereunder. The pocket-like containers 6 which are attached to each sieve box only come into operation at the level of the supply tube 9, whereas the solvent material in the containers lying therebelow flows out through the sieve bottom.

The irrigation can be effected at the descending side of the paternoster-like apparatus one, two, three or more times. At the ascending side it is effected preferably five or more times. Whereas at the ascending side it is preferable to operate with a pure distilled solvent, at the descending side the "half-miscella" obtained from the ascending side is employed for irrigation in order to obtain an enrichment according to the countercurrent principle.

In Fig. 4 another embodiment of the invention is shown.

To a container 1 with a sieve bottom 5 a pocket 6 is attached which has a U form section and which surrounds the rotary peg 1'. In contradistinction to the embodiment shown in Figs. 1 and 2 this pocket 6 is not open at the upper end, but has a protective cover 11, which opposite the supply tube 9 has a permeable gauze layer or wire layer 12. The solvent stream issuing from the nozzle 9 penetrates without a noticeable loss through the wire sieve 12 into the interior of the pocket 6 and at the bottom flows through the opening of the irrigating tubes 10 arranged in the manner already described beneath the sieve box.

The pocket-like container shown in Fig. 4 with a gauze or sieve layer 12 is particularly suitable for the use of "half-miscella" in order to remove solid particles or impurities by filtration at the sieve or gauze surface 12.

It has been found that the fine spray rain which flows with small kinetic energy and in fine streams from the irrigation tubes 10 on to the sieve box next below or the material contained therein penetrates and moistens the material uniformly and destroys the agglomerated layer of fine particles or prevents its formation so that the extraction can be conducted in a short time with relatively small proportions of solvent.

I claim:—

1. An apparatus for the continuous extraction of material on the paternoster principle, said apparatus comprising a plurality of vertically spaced containers, each container having a solvent receiving chamber attached thereto, a plurality of tubes extending from said chamber across and beneath said container, the bottoms of said tubes being perforated whereby solvent may be discharged from said tubes directly into a container below, the bottom of said container being perforated whereby solvent in said container may be discharged from said container directly into a subjacent container.

2. An apparatus as in claim 1, said container having vertical side walls, a chamber attached to each of opposite side walls, said tubes extending from one chamber to another chamber.

3. An apparatus as in claim 1, nozzle means for discharging a solvent into said chamber at a predetermined point of travel of said chamber.

4. An apparatus as in claim 1, nozzle means for discharging a solvent into said chamber at a predetermined point of travel of said chamber, and filter means located in a wall of said chamber whereby solvent passing into said chamber may be filtered.

PETER JOHANNES WERNER ENGLER.